United States Patent
Larson et al.

(10) Patent No.: US 8,323,809 B2
(45) Date of Patent: Dec. 4, 2012

(54) FUEL CELL ELECTROLYTE MEMBRANE WITH BASIC POLYMER

(75) Inventors: James M. Larson, Saint Paul, MN (US); Phat T. Pham, Little Canada, MN (US); Matthew H. Frey, Cottage Grove, MN (US); Steven J. Hamrock, Stillwater, MN (US); Gregory M. Haugen, Edina, MN (US); William M. Lamanna, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 15 days.

(21) Appl. No.: 12/882,310

(22) Filed: Sep. 15, 2010

(65) Prior Publication Data

US 2011/0000615 A1 Jan. 6, 2011

Related U.S. Application Data

(62) Division of application No. 11/230,091, filed on Sep. 19, 2005, now Pat. No. 7,838,138.

(51) Int. Cl.
*H01M 8/10* (2006.01)
(52) U.S. Cl. ............. 429/33; 429/12; 429/30; 429/42; 429/309; 521/27; 204/263; 204/296
(58) Field of Classification Search .............. 429/33, 429/12, 30, 42, 309; 521/27; 204/263, 296
See application file for complete search history.

(56) References Cited

U.S. PATENT DOCUMENTS

| | | | |
|---|---|---|---|
| 4,610,938 A | 9/1986 | Appleby | |
| 5,002,700 A | 3/1991 | Otagawa | |
| 5,525,436 A | 6/1996 | Savinell | |
| 5,981,097 A | 11/1999 | Rajendran | |
| 6,059,943 A * | 5/2000 | Murphy et al. | 204/296 |
| 6,099,988 A | 8/2000 | Savinell | |
| 6,099,998 A | 8/2000 | Shibata | |
| 6,136,412 A | 10/2000 | Spiewak | |
| 6,248,469 B1 | 6/2001 | Formato | |
| 6,335,112 B1 | 1/2002 | Asukabe | |
| 6,447,943 B1 | 9/2002 | Peled | |
| 6,492,047 B1 | 12/2002 | Peled | |

(Continued)

FOREIGN PATENT DOCUMENTS

CA 2498370 4/2004

(Continued)

OTHER PUBLICATIONS

J. A. Asensio, S. Borros, P. Gomez-Romero, "Enhanced Conductivity in Polyanion-Containing Polybenzimidazoles. Improved Materials for Proton-Exchange Membranes and PFM Fuel Cells", Electrochemistry Communications. vol. 5, pp. 967-972, (2003).*

(Continued)

*Primary Examiner* — Peter D. Mulcahy
*Assistant Examiner* — Henry Hu
(74) *Attorney, Agent, or Firm* — Julie A. Lapos-Kuchar; Philip Y. Dahl

(57) ABSTRACT

The present invention is an electrolyte membrane comprising an acid and a basic polymer, where the acid is a low-volatile acid that is fluorinated and is either oligomeric or non-polymeric, and where the basic polymer is protonated by the acid and is stable to hydrolysis.

5 Claims, 5 Drawing Sheets

U.S. PATENT DOCUMENTS

| | | |
|---|---|---|
| 6,495,209 B1 | 12/2002 | Cisar |
| 6,624,328 B1 | 9/2003 | Guerra |
| 6,716,548 B1 | 4/2004 | Kaliaguine |
| 6,772,786 B2 | 8/2004 | Ellett |
| 6,811,911 B1 | 11/2004 | Peled |
| 6,936,365 B2 | 8/2005 | Hobson |
| 7,045,044 B2 | 5/2006 | Nakayama |
| 7,112,386 B2 | 9/2006 | Cipollini |
| 7,229,553 B2 | 6/2007 | Uensal |
| 7,348,088 B2 | 3/2008 | Hamrock |
| 7,358,288 B2 | 4/2008 | Kerres |
| 7,384,552 B2 | 6/2008 | Calundann |
| 7,517,604 B2 | 4/2009 | Hamrock |
| 7,537,853 B2 | 5/2009 | Aihara |
| 7,550,216 B2 | 6/2009 | Ofer |
| 7,838,138 B2 | 11/2010 | Larson |
| 2002/0093008 A1 | 7/2002 | Kerres |
| 2003/0008196 A1 | 1/2003 | Wessel |
| 2004/0043283 A1 | 3/2004 | Cipollini |
| 2004/0096734 A1 | 5/2004 | Calundann |
| 2004/0099527 A1 | 5/2004 | Nakayama |
| 2004/0107869 A1 | 6/2004 | Velamakanni |
| 2004/0118773 A1 | 6/2004 | Uensal |
| 2004/0121210 A1 | 6/2004 | Hamrock |
| 2005/0031925 A1 | 2/2005 | Ofer |
| 2005/0170252 A1 | 8/2005 | Aihara |
| 2006/0204745 A1 | 9/2006 | Jones |
| 2007/0065699 A1 | 3/2007 | Larson |
| 2009/0325030 A1 | 12/2009 | Hamrock |
| 2011/0082310 A1 | 4/2011 | Marion |

FOREIGN PATENT DOCUMENTS

| | | | |
|---|---|---|---|
| CA | 2500784 | | 4/2004 |
| CA | 2444647 | | 11/2004 |
| DE | 10347457 | | 4/2004 |
| EP | 1339072 | | 8/2003 |
| IT | 1335763 | | 3/2002 |
| JP | 08-171923 | * | 7/1996 |
| JP | 8171923 | | 7/1996 |
| JP | 2001240742 | | 9/2001 |
| JP | 2002105129 | | 4/2002 |
| JP | 2003-022824 | * | 1/2003 |
| JP | 2003022824 | | 1/2003 |
| WO | WO 9944425 | | 9/1999 |
| WO | WO 0044816 | | 8/2000 |
| WO | WO 0154216 | | 7/2001 |
| WO | WO 0205370 | | 1/2002 |
| WO | WO 2005003081 | | 1/2005 |
| WO | WO 2006028543 | | 3/2006 |
| WO | WO 2007035294 | | 3/2007 |

OTHER PUBLICATIONS

P.N. Ross, Jr., "Evaluation of Tetrafluoroethane-l,2-Disulfonic Acid as a Fuel Cell Electrolyte", J. Electrochem. Soc., vol. 130, No. 4, Apr. 1983, pp. 882-885.*

Affarian et al., Electrochemical Properties of Perfluoroalkane Disulfonic [HSOa(CF2) nSOaH] Acids Relevant to Fuel Cell Technology, J. Electrochem. Soc., vol. 139, No. 9, Sep. 1992, pp. 2391-2397.*

Mecerreyes, et al., "Porous Polybenzimidazole Membranes Doped with Phosphoric Acid: Highly Proton-Conducting Solid Electrolytes", Chem. Mater:, vol. 16, pp. 604-607, (2004).*

Alberti, "Composite Membranes for Medium-Temperature PEM Fuel Cells", Annu. Rev. Mater. Res, vol. 33, 2003, pp. 129-154.

Appleby, "Novel Solid State Proton-Conductors Based on Polymeric Non-Oxy Acids", Energy Fossil, Jan. 31, 1992, pp. 1-9.

Asensio, "Enhanced Conductivity in Polyanion-Containing Polybenzimidazoles, Improved Materials for Proton-Exchange Membranes and PEM Fuel Cells", Electrochemistry Communications, vol. 5, 2003, pp. 967-972.

Bhamidipati, "Novel Proton Exchange Membrane for High Temperature Fuel Cells", Mat. Res. Soc. Symp. Proc., vol. 496, 1998, pp. 217-222.

Kotov, "Preparation of Perfluorocarbon Polymers Containing Phosphonic Acid Groups", Journal of Florine Chemistry, vol. 82, 1997, pp. 13-19.

Malhotra, "Membrane-Supported Nonvolatile Acidic Electrolytes Allow Higher Temperature Operation of Proton-Exchange Membrane Fuel Cells", J. Electrochem. Soc., vol. 144, No. 2, Feb. 1997, pp. L23-L26.

Maricle, "The GRI Electrolyte Program Tertrafluoroethylene-1, 2-Bis-Phosphonic Acid", International Fuel Cells, HP258 (published prior to Sep. 25, 1991), pp. 1-4.

Mecerreyes, "Porous Polybenzimidazole Membranes Doped with Phosphoric Acid: Highly Proton-Conducting Solid Electrolytes", Chem. Mater., vol. 16, 2004, pp. 604-607.

Patton, Paint Flow and Pigment Dispersion: A Rheological Approach to Coating and Ink Technology, $2^{nd}$ Ed., Wiley-Interscience Publication, John Wiley & Sons, 1979.

Prakash, "Stable, Electroinactive Wetting Agent for Fuel Cells", NASA Tech Briefs, Dec. 1994, pp. 56-57.

Razaq, "Perfluorosulfonimide as an Additive in Phosphoric Acid Fuel Cell", J. Electrochem. Soc., vol. 136, No. 2, Feb. 1989, pp. 385-390.

Ross, Jr., "Evaluation of Tetrafluoroethane-1,2-Disulfonic Acid as a Fuel Cell Electrolyte", J. Electrochem. Soc., vol. 130, No. 4, Apr. 1983, pp. 882-885.

Saffarian, Electrochemical Properties of Perfluoroalkane Disulfonic [HSOa(CF2)nSOaH] Acids Relevant to Fuel Cell Technology, J. Electrochem. Soc., vol. 139, No. 9, Sep. 1992, pp. 2391-2397.

Striebel, "Oxygen Reduction in Tetrafluoroethane-1,2-Disulfonic Acid", Polypyrrole Film Electrodes, vol. 132, No. 10, Oct. 1985, pp. 2381-2384.

International Search Report of Int'l Appln. No. PCT/US2006/035136, 2 pages.

Written Opinion of Int'l Appln. No. PCT/US2006/035136, 6 pages.

* cited by examiner

FUEL CELL ELECTROLYTE MEMBRANE WITH BASIC POLYMER

CROSS REFERENCE TO RELATED APPLICATIONS

This application is a divisional of U.S. Ser. No. 11/230,091, filed Sep. 19, 2005, now U.S. Pat. No. 7,838,138, now allowed, the disclosure of which is incorporated by reference in its entirety herein.

This invention was made with U.S. Government support under Cooperative Agreement DE-FC36-02AL67621 awarded by the Department of Energy. The U.S. Government has certain rights in this invention.

FIELD OF THE INVENTION

The present invention relates to electrolyte membranes in electrochemical devices, such as fuel cells. In particular, the present invention relates to electrolyte membranes that preserve proton conductivity and are stable when operated at high temperatures.

BACKGROUND OF THE INVENTION

Fuel cells are electrochemical devices that produce usable electricity by the catalyzed combination of a fuel such as hydrogen and an oxidant such as oxygen. In contrast to conventional power plants, such as internal combustion generators, fuel cells do not utilize combustion. As such, fuel cells produce little hazardous effluent. Fuel cells convert hydrogen fuel and oxygen directly into electricity, and can be operated at higher efficiencies compared to internal combustion generators.

A fuel cell such as a proton exchange membrane (PEM) fuel cell typically contains a membrane electrode assembly (MEA), formed by a catalyst coated membrane disposed between a pair of gas diffusion layers. The catalyst coated membrane itself typically includes an electrolyte membrane disposed between a pair of catalyst layers. The respective sides of the electrolyte membrane are referred to as an anode portion and a cathode portion. In a typical PEM fuel cell, hydrogen fuel is introduced into the anode portion, where the hydrogen reacts and separates into protons and electrons. The electrolyte membrane transports the protons to the cathode portion, while allowing a current of electrons to flow through an external circuit to the cathode portion to provide power. Oxygen is introduced into the cathode portion and reacts with the protons and electrons to form water and heat. The MEA also desirably retains water to preserve proton conductivity between the layers, particularly at the electrolyte membrane. A reduction in proton conductivity between the layers correspondingly reduces the electrical output of the fuel cell.

A common problem with fuel cells involves carbon monoxide poisoning of the catalyst layers, which reduces the effectiveness of the catalyst layers. To counter the reduction, higher catalyst concentrations are required to provide effective levels of electrical output. This correspondingly increases the material costs for manufacturing fuel cells. One technique for reducing the carbon monoxide poisoning includes operating the fuel cell at higher temperatures (e.g., above 100° C.). However, the elevated temperatures cause the water retained in the MEA to evaporate, thereby reducing the proton conductivity within and between the layers. As such, there is a need for an electrochemical device that preserves proton conductivity while operating at high temperatures.

BRIEF SUMMARY OF THE INVENTION

The present invention relates to an electrolyte membrane that includes an acid and a basic polymer. The acid is a low-volatility acid that is fluorinated and is either oligomeric or non-polymeric. The basic polymer is protonated by the acid and is stable to hydrolysis. As a result, the electrolyte membrane may be used at high operating temperatures while preserving proton conductivity. The present invention further relates to a method of forming the electrolyte membrane and to an electrochemical device that includes the electrolyte membrane.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
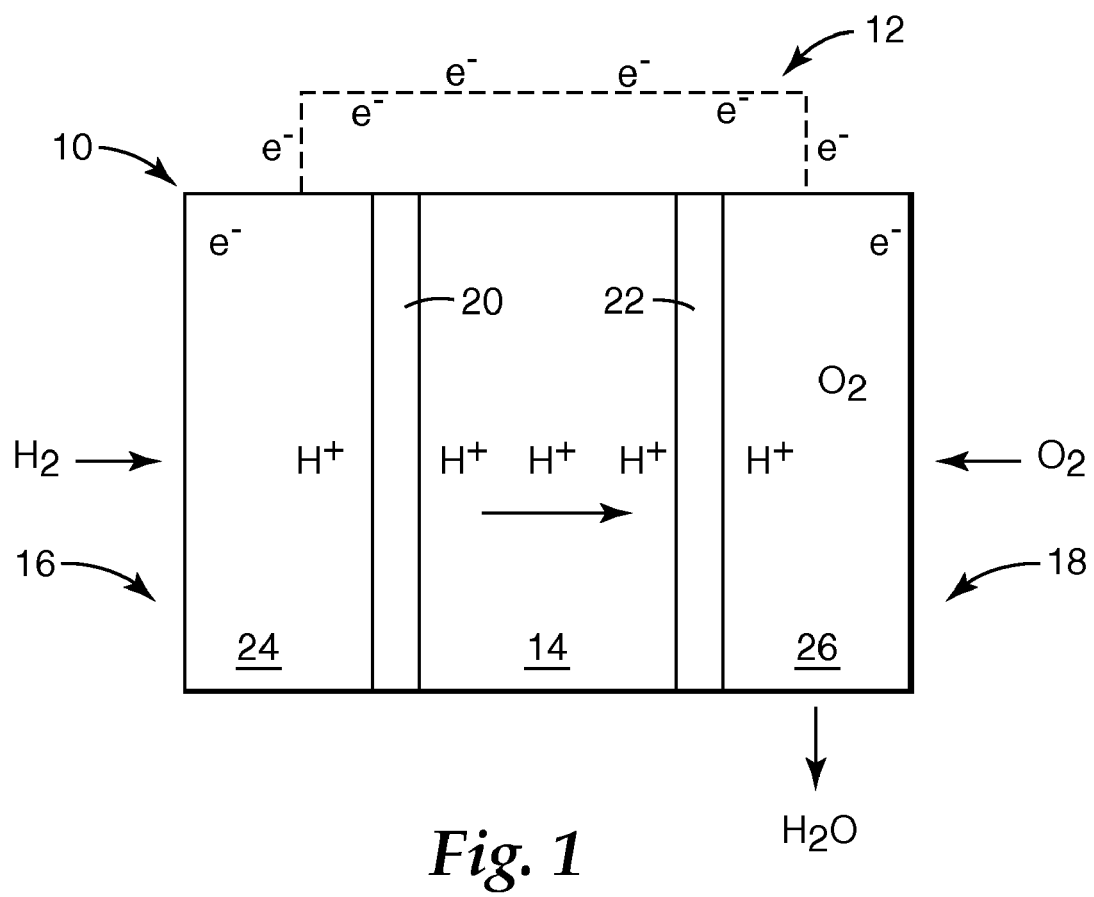
FIG. 1 is a schematic illustration of a membrane electrode assembly of the present invention in use with an external electrical circuit.

FIG. 1 is an illustration of MEA 10 in use with external electrical circuit 12, where MEA 10 includes electrolyte membrane 14 of the present invention. MEA 10 is suitable for use in electrochemical cells, such as PEM fuel cells, and further includes anode portion 16, cathode portion 18, catalyst layers 20 and 22, and gas diffusion layers 24 and 26. Anode portion 16 and cathode portion 18 generally refer to the anode and cathode sides of MEA 10.

Electrolyte membrane 14 is disposed between catalyst layers 20 and 22, where electrolyte membrane 14 and catalyst layers 20 and 22 may be a catalyst coated membrane. Electrolyte membrane 14 is thermally stable and may be operated at high temperatures (e.g., up to 150° C.) for reducing carbon monoxide poisoning of catalyst layers 20 and 22, while preserving proton conductivity.

Catalyst layer 20 is disposed between electrolyte membrane 14 and gas diffusion layer 24, where gas diffusion layer 24 is located at anode portion 16 of MEA 10. Similarly, catalyst layer 22 is disposed between electrolyte membrane 14 and gas diffusion layer 26, where gas diffusion layer 26 is located at cathode portion 18 of MEA 10. Gas diffusion layers 24 and 26 may each be any suitable electrically conductive porous substrate, such as carbon fiber constructions (e.g., woven and non-woven carbon fiber constructions). Gas diffusion layers 24 and 26 may also be treated to increase or impart hydrophobic properties.

During operation of MEA 10, hydrogen fuel ($H_2$) is introduced into gas diffusion layer 24 at anode portion 16. MEA 10 may alternatively use other fuel sources, such as methanol, ethanol, formic acid, and reformed gases. The fuel passes through gas diffusion layer 24 and over catalyst layer 20. At catalyst layer 20, the fuel is separated into hydrogen ions ($H^+$) and electrons ($e^-$). Electrolyte membrane 14 only permits the hydrogen ions to pass through to reach catalyst layer 22 and gas diffusion layer 26. The electrons cannot pass through electrolyte membrane 14. As such, the electrons flow through external electrical circuit 12 in the form of electric current. This current can power an electric load, such as an electric motor, or be directed to an energy storage device, such as a rechargeable battery. Oxygen ($O_2$) is introduced into gas diffusion layer 26 at cathode portion 18. The oxygen passes through gas diffusion layer 26 and over catalyst layer 22. At catalyst layer 22, oxygen, hydrogen ions, and electrons combine to produce water and heat.

Electrolyte membrane 14 of the present invention compositionally includes an acid and a basic polymer. The acid is a low-volatility acid that is fluorinated and is either oligomeric or non-polymeric. The low-volatility of the acid prevents the acid from evaporating at the high operating temperatures of MEA 10. Otherwise, the acid would evaporate and exit MEA 10 with the hydrogen and oxygen gas streams. A "low-volatility acid" is herein defined as an acid that, after being heated from 1° C. to 200° C. at a ramp rate of 10° C./minute, and then cooled to 120° C. within 5 minutes, exhibits a cumulative mass loss of about 6% or less, based on an initial weight of the acid, while being maintained at 120° C. for a 24 hour period, where the cumulative mass loss is measured during the 24 hour period. The cumulative mass loss may be measured with a thermal gravimetric analyzer (TGA). In one embodiment of the present invention, the acid exhibits a volatility that is lower than a volatility of concentrated (e.g., 95%-98% by weight) sulfuric acid.

"Oligomeric", with respect to the acid, is defined herein as an acid molecule that contains twenty acid-functional groups or less, and a molecular weight of less than 10,000. The acid desirably contains ten acid-functional groups or less per molecule, more desirably five acid-functional groups or less per molecule, and even more desirably two acid-functional groups per molecule.

In addition to having multiple acid-functional groups (i.e., multi-functional), the acid may also be perfluorinated to increase thermal stability, such as a perfluorinated bis-acid. The combination of the acid being non-polymeric and multi-functional increases the density of acid functional groups per molecule. This increases the proton conductivity of electrolyte membrane 14 beyond a level achievable with the polymeric acid alone.

Examples of suitable acids for use in electrolyte membrane 14 include sulfonic acids, imide acids, methide acids, and combinations thereof. Examples of particularly suitable acids for use in electrolyte membrane 14 include perfluorinated sulfonic acids, perfluorinated imide acids, and combinations thereof. Examples of suitable perfluorinated sulfonic acids include acids having the formula $HO_3S(CF_2)_nSO_3H$, where "n" ranges from 1-10 (e.g., a disulfonic acid having the formula $HO_3S(CF_2)_4SO_3H$, which is herein referred to as disulfonate or disulfonate acid). Examples of suitable perfluorinated imide acids include acids having the formula $C_mF_{2m+1}SO_2NHSO_2(CF_2)_nSO_2NHSO_2C_mF_{2m+1}$, where "m" ranges from 1-8 (e.g., $C_1$-bis-imide having the formula $CF_3SO_2NHSO_2(CF_2)_4SO_2NHSO_2CF_3$ and $C_4$-bis-imide having the formula $C_4F_9SO_2NHSO_2(CF_2)_4SO_2NHSO_2C_4F_9$).

Additional examples of suitable perfluorinated sulfonic acids and perfluorinated imide acids include the above-discussed acids, where the $(CF_2)_n$ groups and the $C_mF_{2m+1}$ groups include heteroatoms, such as nitrogen, oxygen, and combinations thereof. Additionally, further examples of suitable perfluorinated sulfonic acids and perfluorinated imide acids include the above-discussed acids, where the $(CF_2)_n$ groups and the $C_mF_{2m+1}$ groups are branched, linear, cyclic, and combinations thereof.

Examples of suitable concentrations of the acid in electrolyte membrane 14 range from about 15% by weight to about 85% by weight, with particularly suitable concentrations ranging from about 50% by weight to about 80% by weight. The weight percents of the acid are based on the entire weight of electrolyte membrane 14, not including any reinforcement matrix used in electrolyte membrane 14 (discussed below).

Electrolyte membrane 14 also desirably exhibits low concentrations of phosphoric acid. Phosphoric acid poisons platinum catalyst layers of fuel cells, which reduces their effectiveness. A typical solution to overcome the poisoning when using phosphoric acid involves increasing the concentration of the platinum catalyst layers to at least about two milligrams/centimeter$^2$ of platinum. This platinum concentration, however, is about 10-20 times greater than the desired platinum concentration, and substantially increases the raw material costs for manufacturing fuel cells. Accordingly, electrolyte membrane 14 desirably contains less than about 60% by weight phosphoric acid. More desirably, electrolyte membrane 14 contains less than about 25% by weight phosphoric acid. Even more desirably, electrolyte membrane 14 is substantially free of phosphoric acid.

The basic polymer used in electrolyte membrane 14 is stable to hydrolysis and is protonated by the acid. Hydrolysis stability means that the basic polymer in electrolyte membrane 14 retains at least about 90% of its original functional groups and at least about 90% of its original molecular weight when electrolyte membrane 14 is subjected to an environmental temperature of 85° C. and an environmental relative humidity of 95% for 100 hours.

Examples of suitable basic polymers for use in electrolyte membrane 14 include polymers having backbone chains with aromatic groups, polymers having fluorinated backbone chains, and combinations thereof. Examples of particularly suitable basic polymers include polyimidazoles (e.g., polybenzimidazoles), polyazoles (e.g., polybenzoxazoles, polyvinylimidazoles, and polyvinylcarbazoles), polyvinylpyridines, polyvinylimines, and combinations thereof. Examples of suitable polybenzimidazoles include poly[2,2'-(m-phenylene)-5,5'-bibenzimidazole] (PBI), poly[2,5-benzimidazole] (ABPBI), a polybenzimidazole commercially available under the trade designation "PBIO" from FuMA Tech GmbH, Germany, and primarily having the following repeating monomer formula:

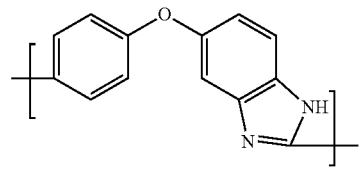

Examples of suitable concentrations of the basic polymer in electrolyte membrane 14 range from about 10% by weight to about 60% by weight, with particularly suitable concentrations ranging from about 25% by weight to about 35% by weight. The weight percents of the basic polymer are based on the entire weight of electrolyte membrane 14, not including any reinforcement matrix used in electrolyte membrane 14 (discussed below).

The basic polymer is also thermally stable for use at high operation temperatures. For example, when measured by a TGA, PBI exhibits a first mass loss of about 4% at temperatures ranging from about 418° C. to about 491° C. For PBI with four moles of $C_1$-bis-imide acid, the first mass loss of the polymer/acid combination was about 12% at temperatures ranging from about 274° C. to about 306° C. Similarly, PBIO exhibited a first mass loss of about 12% at temperatures ranging from about 295° C. to about 397° C.

While PBIO is less thermally stable than PBI, the temperature for mass loss was comparable to mass losses of the acids suitable for use in electrolyte membrane 14. For electrolyte membrane 14 containing disulfonate acid and PBIO in a molar ratio of 4:1, the first mass loss due to the polymer/acid combination was about 54% at temperatures ranging from about 322° C. to about 335° C. For electrolyte membrane 14 containing $C_1$-bis-imide acid and PBIO in a molar ration of 2:1, the first mass loss due to the polymer/acid combination was about 36% at temperatures ranging from about 264° C. to about 289° C. Accordingly, the suitable basic polymers for use in electrolyte membrane 14, alone or in combination with the acid, exhibit adequate thermal stability for use in electrochemical devices operating at temperatures up to 150° C.

Electrolyte membrane 14 may also include inorganic additives, such as proton conductive inorganic additives. The inorganic additives may be particles or may be molecularly dispersed or dissolved in electrolyte membrane 14. Examples of suitable inorganic additives include metal oxide particles, such as silica (e.g., amorphous fumed silica and silica gel), zirconia, silica having silane-coupled sulfonic acid groups, zirconia having silane-coupled sulfonic acid groups, sulfated zirconia, zirconium phosphates, zirconium phosphonates, zirconium phosphate sulfophenylenephosphonate, mixed metal-oxide gels (e.g., silica-calcia-phosphorous oxide gels), mixed metal-oxide glasses, superprotonic conductors (e.g., hydrogensulfate and hydrogenphosphate salts of cesium), heteropolyacids, and combinations thereof. The particle shapes may be spherical, acicular, branched, plate-like, or fibrous.

Examples of suitable commercially available inorganic additives include amorphous fumed silicas available under the trade designation "CAB-O-SIL" from Cabot Corp., Tuscola, Ill.; amorphous fumed silicas and silica gels available from Alfa Aesar, Ward Hill, Mass. (e.g., Catalog Nos. 42737, 41502, and 42729); and a silica sol that is acid-stabilized and nominally free of anions, and available under the trade designation "NALCO 1042" from Nalco, Naperville, Ill.

Examples of suitable average particle sizes for the particulate inorganic additives range about 1 nanometer to about 10 micrometers, with particularly suitable average particle sizes ranging from about 5 nanometers to about 1 micrometer, and even more particularly suitable average particle sizes ranging from about 10 nanometers to 500 nanometers. The particulate inorganic additives may also mesoporous, such as those provided by surfactant templated synthesis (STS). Metal oxide sols that are free of stabilizing counter ions and that are transferred into a solvent for the basic polymer, as discussed below, may also be used.

Examples of suitable concentrations of the inorganic additives in electrolyte membrane 14 range from about 5% by weight to about 60% by weight, with particularly suitable concentrations ranging from about 10% by weight to about 40% by weight. The weight percents of the inorganic additives are based on the entire weight of electrolyte membrane 14, not including any reinforcement matrix used in electrolyte membrane 14 (discussed below).

Electrolyte membrane 14 may also include oxidation stabilizers. Examples of suitable oxidation stabilizers for use in electrolyte membrane 14 include those disclosed in Asukabe et al., U.S. Pat. No. 6,335,112; Wessel et al., U.S. Patent Application Publication No. 2003/0008196; and Cipollini et al., U.S. Patent Application Publication No. 2004/0043283.

Electrolyte membrane 14 may also be reinforced mechanically using a reinforcement matrix, such as a woven cloth or non-woven, and which is made from materials resistant to acidic and oxidizing conditions at high temperatures. Examples of suitable resistant matrix materials include polymers such as polytetrafluoroethylene (PTFE), polyphenylene sulfide, polysulfones, polyetheretherketone (PEEK), fluorinated ethylene-propylene (FEP), polyvinylidenedifluoride, ter-polymers of PTFE, hexafluoropropylene, and vinylidene fluoride (THV), liquid crystalline polyesters, and glass and other ceramics stable in acidic environments. For lower operating temperatures, reinforcement matrices such as ultra-high-molecular weight polyethylene may also be used.

The reinforcement matrix desirably exhibits an average pore size greater than about 0.01 micrometer. When electrolyte membrane 14 includes inorganic additives, the reinforcement matrix desirably exhibits a large average pore size to allow the inorganic additives to pass through without hindrance. Examples of suitable average pore sizes for the reinforcement matrix include sizes that are at least ten times greater than the average particle size of the inorganic additives. Examples of particularly suitable average pore sizes for the reinforcement matrix include sizes that are at least twenty times greater than the sizes of the largest inorganic additives. This allows uniform filling of the reinforcement matrix.

Examples of suitable reinforcement matrices with smaller pore sizes include matrices made from polymers having adequate thermal and chemical stability under highly acidic, oxidizing conditions at temperatures up to 150° C., such as expanded polytetrafluoroethylene, polyethersulfone, and other polymers having aromatic backbones or fluorinated backbones. Ultra-high-molecular weight polyethylene may also be used.

Electrolyte membrane 14 may be formed by initially blending the acid, the basic polymer, and optionally the inorganic additives. Prior to blending, the basic polymer may be initially dried and dissolved or dispersed in a liquid to form a basic polymer solution/dispersion. The liquid used may vary based on the basic polymer. Examples of suitable solvents include 1-methyl-2-pyrrolidinone, dimethylacetamide, dimethyl sulfoxide, methanol, methane sulfonic acid, n-propanol, water, and combinations thereof. Small quantities of other liquids for the basic polymer may also be used to assist dissolving or dispersing other components or maintaining stable suspensions of inorganic additives. The acid may be dissolved in the same liquid used for the basic polymer to form an acid solution. Likewise, other liquids for the basic polymer may also be incorporated into the acid solution to assist in dissolving the acid or for maintaining stable suspensions of inorganic additives. The basic polymer solution and the acid solution may then be blended together to form a blended solution or dispersion.

The inorganic additives may be dispersed with the basic polymer solution/dispersion, the acid solution, or with both the basic polymer solution/dispersion and the acid solution. Acidic inorganic additives, such as heteropolyacids, are desirably dispersed with the acid solution prior blending. The inorganic additives may be dispersed in the basic polymer solution/dispersion using standard dispersion techniques that provide sufficient shear to disperse the inorganic additives in the basic polymer solution/dispersion. Additionally, the dispersion techniques may also reduce the particle sizes of the inorganic additives to assist in dispersion process. Examples of suitable dispersion techniques are disclosed in Temple C.

Patton, *Paint Flow and Pigment Dispersion*, 2$^{nd}$ Ed., John Wiley & Sons, 1979. Adsorption of atmospheric water during the dispersion process is also desirably minimized, since water is generally a non-solvent for the basic polymer.

Sols of inorganic materials in organic solvents may be dispersed with either the acid solution or the basic polymer solution/dispersion before blending, or dispersed in the blended solution/dispersion. For example, silica and zirconia sols may be transferred from their native aqueous solvent to 1-methyl-2-pyrrolidinone by adding 1-methyl-2-pyrrolidinone and n-propanol to the sol. The sols may then be blended with the basic polymer solution/dispersion or the acid solution.

After blending, the blended mixture may then be applied to a surface (e.g., a glass plate) and dried to form electrolyte membrane 14. This may be performed by applying the blended mixture to the surface and spreading the blended mixture. The coating may then be dried in an oven to remove the solvent. After removal from the oven, the resulting electrolyte membrane 14 may be allowed to stand in open air to cool.

In one embodiment of the present invention, electrolyte membrane 14 may also be cross-linked using a variety of cross-linking techniques, such as photochemical, thermal, and electron-beam techniques. Examples of suitable cross-linking techniques include electron-beam, infrared, and ultraviolet cross-linking. The cross-linking may be performed in the presence of one or more cross-linking agents. Suitable cross-linking agents for use with the fluoropolymers of the present invention include multifunctional compounds, such as multifunctional alkenes and other unsaturated cross-linkers. The cross-linking agents may be non-fluorinated, fluorinated to a low level, highly fluorinated, or more preferably, perfluorinated. The cross-linking agents may introduced to the composition of electrolyte membrane 14 by any conventional manner. A suitable technique for introducing the cross-linking agent includes blending the cross-linking agent with the composition of electrolyte membrane 14 before forming the composition into a membrane. Alternatively, the cross-linking agent may be applied to electrolyte membrane 14, such as by immersing electrolyte membrane 14 in a solution of the cross-linking agent.

Electrolyte membrane 14 may also be inserted into a reinforcement matrix by pressing, coating, filling, or laminating (or combinations thereof) electrolyte membrane 14 on one or both sides of the matrix. When pressing or filling the reinforcement matrix, the reinforcement matrix desirably exhibits pore sizes greater than about 25 micrometers. The suitable pore size is generally dependent on the viscosity of the polymer melt and the pressing conditions. Examples of suitable pressing conditions include pressing for about 5 minutes at a pressure ranging from 6.9 megapascals (about 1000 pounds/inch$^2$) to about 34.5 megapascals (about 5000 pounds/inch$^2$). For example, for an embodiment of the present invention where electrolyte membrane 14 includes PBI basic polymer, electrolyte membrane 14 may be preheated in a press without pressure for about 2 minutes at 132° C., and then pressed for 5 minutes at 8.6 megapascals (about 1250 pounds/inch$^2$). For an embodiment of the present invention where electrolyte membrane 14 includes PBIO basic polymer, electrolyte membrane 14 may be preheated in a press without pressure for about 4 minutes at 177° C., and then pressed for 5 minutes at 17.2 megapascals (2500 pounds/inch$^2$) and 350° C. The reinforcement matrix increases the structural integrity of electrolyte membrane 14 for use in MEA 10.

When filling a reinforcement matrix that is not penetrated by a solution of the components of electrolyte membrane 14 (e.g., expanded PTFE), the reinforcement matrix may be pre-filled with a liquid suitable for the basic polymer of electrolyte membrane 14, which completely penetrates the reinforcement matrix. For a basic polymer solution containing PBI and dimethylacetamide, an example of a suitable liquid for pre-filling the expanded PTFE includes a 60/40 (by weight) mixture of acetone and dimethylacetamide. For a basic polymer solution containing PBIO and 1-methyl-2-pyrrolidinone, an example of a useful liquid for pre-filling the expanded PTFE includes a 50/50 (by weight) mixture of isopropanol and 1-methyl-2-pyrrolidinone.

In one embodiment of the present invention, the acid and the basic polymer form a substantially homogenous blend in electrolyte membrane 14. For example, PBI and ABPBI may form substantially homogeneous blends with $C_1$-bis-imide acid and $C_4$-bis-imide acid up to about 2.4% by weight polymer, based on the entire weight of the polymer/acid blend. PBIO may form substantially homogeneous blends with $C_1$-bis-imide acid, $C_4$-bis-imide acid, and disulfonate acid up to about 6.6% by weight polymer, based on the entire weight of the polymer/acid blend. Homogenous blends are desirable for formation of electrolyte membranes by coating, which are uniform and exhibit good mechanical properties.

As discussed above, electrolyte membrane 14 exhibits good proton conductivity under low levels of humidification. While not wishing to be bound by theory, it is believed that proton conductivity through an electrolyte membrane increases as the level of humidification increases. If the level of humidification is reduced, such as by evaporation at operating temperatures greater than 100° C., the proton conductivity diminishes. This correspondingly reduces the overall electrical output of the electrochemical device. One common technique to maintain the desired humidity level within the electrochemical device is to humidify the inlet gas streams. However, humidification of the inlet gas streams reduces the concentration of reactive gases, which also reduces the overall electrical output of the electrochemical device. Another alternative technique involves pressurizing the inlet gas streams to increase the relative humidity within the electrochemical device. However, pressurization imparts a degree of parasitic power loss, which also decreases the overall electrical output.

Electrolyte membrane 14, however, exhibits good proton conductivity under low levels of humidification. This allows MEA 10 to operate at temperatures greater than 100° C. with low humidification of the gas stream. In one embodiment of the present invention, MEA 10 may operate with inlet gas streams having a dew point of 80° C. or less at atmospheric pressure, which provides a 0.3% relative humidity at 120° C. This allows a high concentration of the reactive gases to be used in MEA 10 while also preserving proton conductance through electrolyte membrane 14 at high operating temperatures.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and component weight percents are based on the entire weight of the membrane, excluding any reinforcement matrix used. All reagents used in the examples were obtained, or are available, from the chemical suppliers described below, from general chemical suppliers such as Sigma-Aldrich Company, Saint Louis, Mo., or may be synthesized by conventional techniques.

The following compositional abbreviations are used in the following Examples:

Disulfonate: Disulfonate acid with the formula $HO_3S(CF_2)_4SO_3H.4H_2O$, which is synthesized as discussed below.

$C_1$-bis-imide: A bis-imide acid with the formula $CF_3SO_2NHSO_2(CF_2)_4SO_2NHSO_2CF_3.4H_2O$, which is synthesized as discussed below.

$C_4$-bis-imide: A bis-imide acid with the formula $C_4F_9SO_2NHSO_2(CF_2)_4SO_2NHSO_2C_4F_9.4H_2O$, which is synthesized as discussed below.

PBI: A basic polymer with the formula poly[2,2'-(m-phenylene)-5,5'-bibenzimidazole], commercially available from Celanese Corp., Dallas, Tex.

PBIO: A basic polymer with the following formula:

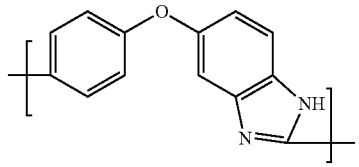

commercially available as PBIO powder from FuMA-Tech GmbH, Ingbert, Germany.

ABPBI: A basic polymer with the formula poly(2,5-benzimidazole) commercially available as ABPBI powder from FuMA-Tech GmbH, Ingbert, Germany.

AF-100: Amorphous fumed silica having a surface area of 100 meters$^2$/gram, and which is commercially available under Catalog No. 42737 from Alfa Aesar, Ward Hill, Mass.

AF-400: Amorphous fumed silica having a surface area of 400 meters$^2$/gram, and which is commercially available under the trade designation "CAB-O-SIL EH-5" from Cabot Corp., Tuscola, Ill.

SiWA: Silicotungstic acid commercially available under Catalog No. 87372 from Alfa Inorganics, Beverly, Mass.

PWA: Phosphotungstic acid commercially available under Catalog No. CB-582-PX1055 from Matheson Coleman & Bell, Cincinnati, Ohio.

$ZrO_2$ sol: A zirconia sol prepared as described in the commonly-assigned patent application Ser. Nos. 11/079,832 (filed Mar. 14, 2005) and 10/079,832 (filed Jun. 16, 2005), which has an average particle size of 20 nanometers, and is stabilized by acetic acid. The total percent solids was 46.24% with zirconia constituting 41.52% of the solids (the balance being acetic acid).

THONEX PW106: A reinforcement matrix having a 38.1 micrometer (1.5 mil) thickness, an 18.1 grams/meter$^2$ basis weight, and 24×23 threads/centimeter, and which is commercially available under the trade designation "THONEX PW106" from Thonex Corporation, Cross River, N.Y.

CRANE HM090: A liquid crystalline non-woven reinforcement matrix having a 50.8 micrometer (2 mil) thickness, an 8.9 grams/meter$^2$ weight basis, and which is commercially available under the trade designation "CRANE HM090" from Crane & Company, Inc., Dalton, Mass.

TETRATEX 1316 An expanded PTFE reinforcement matrix having a 0.07 micrometer pore size (bubble point), a 7.4 grams/meter$^2$ basis weight, and about 70% porosity, and which is commercially available under the trade designation "TETRATEX 1316" from Donaldson Company, Inc., Ivyland, Pa.

NMP: 1-methyl-2-pyrrolidinone commercially available from Sigma-Aldrich Company, Saint Louis, Mo.

DMAc: Dimethylacetamide commercially available from Sigma-Aldrich Company, Saint Louis, Mo.

MeOH: Methanol commercially available from Sigma-Aldrich Company, Saint Louis, Mo.

MSA: Methane sulfonic acid commercially available from Sigma-Aldrich Company, Saint Louis, Mo.

n-PrOH: N-propanol commercially available from Sigma-Aldrich Company, Saint Louis, Mo.

The synthesis of disulfonate acid, $C_1$-bis-imide acid, and $C_4$-bis-imide acid were performed as follows:

Disulfonate Acid

Disulfonate acid used in the following Examples was synthesized pursuant to the following procedure. 126.1 grams of $LiOH.H_2O$, 130.0 grams of deionized water, and 130.0 grams of methanol were charged to a 3.0 liter 3-necked flask equipped with a mechanical stirrer, addition funnel, Claisen adapter, reflux condenser and thermocouple probe. The mixture was chilled to about 0° C. in an ice bath. Liquid $FSO_2(CF_2)_4SO_2F$ was then gradually added from the addition funnel while stirring. The addition rate was adjusted so the temperature from the reaction exotherm was controlled between 56° C. and 75° C. Once the reaction exotherm subsided, a heating mantle was installed and the reaction temperature was held at 60° C. overnight to drive the hydrolysis to completion.

After cooling to room temperature, the reaction solution was treated with dry ice pellets for about one hour while controlling reaction temperature at 30° C., and while stirring to convert excess LiOH to lithium carbonate. The reaction solution was then allowed to cool overnight.

After the overnight cooling, the reaction solution was treated with 5.6 grams of Celite at room temperature while stirring. The reaction solution was then filtered by suction through a pad of Celite to recover the filtrate. The filtrate was evaporated to dryness on a rotary evaporator at 20 mmHg and 100° C. to yield a white solid. The white solid was dissolved in 500 milliliters of pure anhydrous MeOH to produce a cloudy solution that was filtered again by suction to give a clear filtrate. The clear filtrate was evaporated to dryness on a rotary evaporator at 20 mmHg and 100° C. to yield 279 grams of white solid dilithium salt. The white solid was then dissolved in 840 grams of deionized water and the resulting clear solution was subjected to proton exchange in eight 140-gram portions on a freshly prepared 34-cemtimeter×4-centimeter column of Mitsubishi SKT10 proton exchange resin. Deionized water was used as the eluent. The aqueous solutions of disulfonic acid collected from the proton exchange column were evaporated to dryness on a rotary evaporator at 20 mmHG and 100° C., which produced a 92% yield (272 grams) of $HOSO_2(CF_2)_4SO_2OH.4H_2O$ as a slightly off-white solid. The purity was shown to be better than 99% according to quantitative $^1H$ and $^{19}F$-NMR analysis in $CD_3OD$.

$C_1$-Bis-Imide Acid $C_1$-bis-imide acid used in the following Examples was synthesized pursuant to the following procedure. 305 grams of anhydrous $C_4F_9SO_2NH_2$, 221 grams of anhydrous triethylamine, and 188 grams of liquid $FSO_2(CF_2)_4SO_2F$ were charged to a 2.0 liter 3-necked flask equipped with a mechanical stirrer, addition funnel, Claisen adapter, water cooled reflux condenser, heating mantle and thermocouple probe. A moderate reaction exotherm caused self-heating of the reaction solution to 80° C. After the reaction exotherm subsided, the reaction temperature was gradually ramped to 92° C.-99° C. (mild reflux) while stirring and held at this temperature for 21 hours. The resulting orange brown reaction solution was allowed to cool to room temperature while stirring. The reaction solution was then combined with 716 grams of methylene chloride.

The methylene chloride solution of crude product was transferred to a reparatory funnel and washed with four 800-milliliter portions of deionized water. After the final water wash, the lower methylene chloride phase was drained to a 2.0 liter, 3-necked flask and combined with 1.0 liter of deionized water. The flask was fitted with a short path distillation head and all methylene chloride was removed by distillation with mechanical stirring at atmospheric pressure. Once all methylene chloride was removed, 44.85 grams of $LiOH.H_2O$ was added to the contents remaining in the distillation pot while stirring. Distillation was then resumed to remove liberated triethylamine and sufficient water to concentrate the dilithium salt of bis-imide to approximately 50% by weight in water. The resulting aqueous solution of the dilithium bis-imide salt was allowed to cool to room temperature.

The aqueous solution was then treated with 16 grams of DARCO G-60 (American Norit Company, Inc., Atlanta, Ga.) decolorizing carbon while stirring and then filtered by suction through a Celite pad to remove carbon and other insoluble particulates. The recovered filtrate was a dark red-brown liquid weighing 892 grams and containing 48.2% non-volatile solids. This solution was divided into nine portions of equal mass, and each portion was individually subjected to proton exchange on a freshly prepared 34-cemtimeter×4-centimeter column of Mitsubishi SKT10 proton exchange resin. Deionized water was used as the eluent. The aqueous solutions of di-imide acid collected from the proton exchange column were filtered by suction and then evaporated to dryness on a rotary evaporator at 20 mmHg at 100° C. to produce about a 90% yield (409 grams) of crude $C_4F_9SO_2NHSO_2(CF_2)_4SO_2NHSO_2C_4F_9.4H_2O$ as a light brown solid.

This crude product was purified by redissolution in water and neutralization with an excess of aqueous potassium hydroxide to cause crystallization of the dipotassium di-imide salt. The suspension of crystals was filtered by suction at 0° C. through a sintered glass frit and washed with water. The recovered solid was recrystallized two more times from hot water at about 26% solids producing a 90% overall yield of dipotassium salt as an off-white crystalline solid. The purified dipotassium salt was then converted back to the di-imide acid by dissolution in 50:50 methanol/water at 14.5% solids, and subjecting this solution (in 255-gram portions) to proton exchange chromatography as discussed above, but this time using 50:50 methanol/water as the eluent. The eluted methanol/water solution of product was evaporated to dryness on a rotary evaporator at 20 mmHg at 100° C. producing about an 80% yield of purified $C_4F_9SO_2N(H)SO_2(CF_2)_4SO_2N(H)SO_2C_4F_9.4H_2O$ as an off-white solid. The purity was shown to be better than 99% according to quantitative $^1H$ and $^{19}F$-NMR analysis in $CD_3OD$.

$C_4$-Bis-Imide Acid $C_4$-bis-imide acid used in the following Examples was prepared pursuant to the procedure discussed above for the $C_1$-bis-imide acid, except that anhydrous $CF_3SO_2NH_2$ was used in place of $C_4F_9SO_2NH_2$ as the reagent. The purity of the final di-imide acid was shown to be 94.3% according to quantitative $^1H$ and $^{19}F$-NMR analysis in $CD_3OD$.

Example 1

The membrane of Example 1 was prepared pursuant to the following procedure. PBI was initially dried at 138° C. in a vacuum oven for 12 hours at 5-10 mmHg using a nitrogen purge stream. The high molecular weight fraction of the PBI was then obtained by refluxing a mixture of about 20% by weight PBI in dry DMAc (<0.005% by weight water) for 5 hours. The mixture was then filtered to remove the undissolved high molecular weight PBI, which constituted about 25% by weight of the total initial mass of the PBI. The high molecular weight fraction had an inherent viscosity of 1.35 deciliters/gram in 96% sulfuric acid at 30° C., as compared to 1.08 deciliters/gram for PBI before fractionation. Viscosities were measured using an Ubbelohde 1B viscometer. The high molecular weight PBI was then dissolved at about 5% by weight in DMAc at 260° C. using a Parr pressure vessel (model 4563, 600 milliliters). Pressure generated was about 100 psi. This solution was then concentrated using a rotary evaporator to provide a 10% solution by weight of high molecular weight PBI in DMAc ("PBI solution").

AF-100 inorganic powder was then dispersed in the PBI solution by adding the inorganic additives and 25-30 grams of the PBI solution to a screw-cap 4 ounce glass bottle. Fourteen ceramic milling cylinders (type BRUNHP050 from U.S. Stoneware Corporation, East Palestine, Ohio) were also added to the glass bottle, and a double layer of 50.8-micrometer (2-mil) Teflon film was inserted between the glass bottle and the bottle cap. The sealed bottle was then rolled on a bottle roller at 100 rotations-per-minute for 24 hours. The number of milling cylinders and the rotations-per-minute were adjusted as needed to induce tumbling in the glass bottle. In addition the dispersion viscosity was adjusted as necessary by adding incremental amounts of DMAc to the glass bottle. This resulted in a "PBI/inorganic dispersion".

$C_1$-bis-imide acid was dissolved in DMAc to form a 10% acid solution. The calculated mass of dry $C_1$-bis-imide acid was transferred into a small vial inside a nitrogen purged dry box. A total of about 0.25 g of the $C_1$-bis-imide acid was used. The calculated amount of DMAc was added to the acid inside the dry box. A magnetic stir bar was used for mixing. Dissolution occurred within about 30 minutes. The calculated amount of PBI/inorganic dispersion was then added to the acid solution inside the dry box and mixed with a magnetic stirrer for one hour to form a blended mixture.

The blended mixture was then applied to a glass plate using a plastic pipette and spread using a hand-held, 6-inch wide Gardner-Neotec knife coater from Pacific Scientific. The knife gap used was calculated to provide a dry thickness of about 2-3 mil based on the percent solids of the blended mixture and the general rule that the wet thickness provided by a knife coater is about half the knife coater gap.

The coating was dried in an oven at 140° C. for five hours in a flammable-rated circulating air oven to remove the DMAc. After removal from the oven, the membrane was allowed to stand in open air. At 20% relative humidity, the membrane absorbed sufficient water after several hours to loosen its bond to the glass plate. The membrane was then peeled from the glass plate.

After drying, the membrane was then pressed into both sides of a THONEX PW106 reinforcement matrix. Prior to pressing, the reinforcement matrix was placed between two pieces of 50.8-micrometer (2-mil) Teflon film, which were correspondingly placed between two press plates. The sample area was 26 centimeters$^2$, and was preheated in the press without pressure for 2 minutes at 132° C. The sample was then pressed for 5 minutes using a 4.4 kilonewton force (1000 pound-force). Table 1 provides the component concentrations, the acid-to-base equivalency, and the thickness of the membrane of Example 1.

TABLE 1

| Composition | Example 1<br>Percent by Weight |
|---|---|
| $C_1$-bis-Imide Acid | 76.0 |
| PBI Basic Polymer | 11.2 |
| AF-100 Inorganic Additive | 12.8 |
| Acid-to-Base Equivalency | 3:1 |
| Reinforcement Matrix | THONEX PW106 |
| Membrane Thickness (mils) | 10.0-10.6 |

Acid-to-base equivalencies used herein are based on equivalents, where the number of equivalents is determined by dividing the mass of the substance by the equivalent weight. The equivalent weight of a substance participating in a neutralization reaction is a weight that either contributes or reacts with one gram-formula weight of hydrogen ion in the neutralization reaction. For example, the molecular weight for one PBI repeat unit is 308 grams/mole, and the equivalent weight is accordingly 154 grams/equivalent. Disulfonate acid has a molecular weight of 434 grams/mole for the tetrahydrate, and the equivalent weight is accordingly 214 grams/equivalent. For PBIO, the equivalent weight is the same as the molecular weight (212.13). However, for PBIO, empirical equivalent weight of 217 grams/equivalent based on elemental analysis for nitrogen was used herein.

Membrane thicknesses used herein were quantitatively measured pursuant to the following procedure. To prevent direct contact of the gauge with the membrane, the membrane was sandwiched between two pieces of 50.8-micrometer (2-mil) Teflon film and the thickness due to the Teflon films was zeroed out. For the membranes containing reinforcement matrices, a spring-loaded gauge from Mitutoyo, No. 7326 was used to measure the thicknesses. Otherwise, a Sylvac Ultra Digit Mark IV gauge having an eight-millimeter foot diameter was used. Several measurements were taken for each membrane, and the range of thicknesses are provided.

Example 2

The membrane of Example 2 included PBIO in lieu of PBI, and was prepared pursuant to the following procedure. PBIO was initially dried at 138° C. in a vacuum oven for 12 hours at 5-10 mmHg using a nitrogen purge stream. The PBIO was then dissolved in dry NMP (<0.005% by weight water) at about 5% by weight at 260° C. using the Parr pressure vessel. Pressure generated was about 276 kilopascals (about 40 pounds/inch). The PBIO solution was then concentrated to 10% by weight using a rotary evaporator ("PBIO solution").

AF-100 and SiWA inorganic powders were then dispersed in the PBIO solution to form a "PBIO/inorganic dispersion" in the same manner as discussed above in Example 1 for the PBI/inorganic dispersion. The only exception was that the solution viscosity was adjusted as necessary by adding incremental amounts of NMP to the glass bottle.

$C_4$-bis-imide acid was dissolved in NMP to form a 20% acid solution. The calculated mass of dry $C_4$-bis-imide acid was transferred into a small vial inside a nitrogen purged dry box. A total of about 0.25 g of the $C_1$-bis-imide acid was used. The calculated amount of NMP was added to the acid inside the dry box. A magnetic stir bar was used for mixing. Dissolution occurred within about 30 minutes. The calculated amount of PBIO/inorganic dispersion was then added to the acid solution inside the dry box and mixed with a magnetic stirrer for one hour to form a blended mixture. The blended mixture was then applied to a glass plate and dried in the same manner as discussed above in Example 1 to form a membrane.

After drying, the membrane was then pressed into both sides of a CRANE HM090 reinforcement matrix. Prior to pressing, the reinforcement matrix was placed between two pieces of 50.8-micrometer (2-mil) Teflon film, which were correspondingly placed between two press plates. The sample area was about 26 centimeters$^2$, and was preheated in the press without pressure for about four minutes at 177° C. The sample was then pressed for five minutes using a using 8.9 kilonewton force (2000 pound-force) at 350° C. Table 2 provides the component concentrations, the acid-to-base equivalency, and the thickness of the membrane of Example 2.

TABLE 2

| Composition | Example 2<br>Percent by Weight |
|---|---|
| $C_4$-bis-Imide Acid | 51.2 |
| PBIO Basic Polymer | 7.4 |
| AF-100 Inorganic Additive | 8.3 |
| SiWA Inorganic Additive | 33.1 |
| Acid-to-Base Equivalency | 3:1 |
| Reinforcement Matrix | CRANE HM090 |
| Membrane Thickness (mils) | 3.3-3.6 |

Examples 3 and 4

The membranes of Examples 3 and 4 were each prepared pursuant to the procedure discussed above for Example 2, except that disulfonate acid was used instead $C_4$-bis-imide acid, AF-100 was used instead of the combination of AF-100 and SiWA, and the membranes of Examples 3 and 4 were not pressed into reinforcement matrices. Table 3 provides the component concentrations, the acid-to-base equivalencies, and the thicknesses of the membranes of Examples 3 and 4.

TABLE 3

| Composition | Example 3<br>Percent by Weight | Example 4<br>Percent by Weight |
|---|---|---|
| Disulfonate Acid | 64.8 | 58.2 |
| PBIO Basic Polymer | 16.5 | 19.7 |
| AF-100 Inorganic Additive | 18.7 | 22.1 |
| Acid-to-Base Equivalency | 4:1 | 3:1 |
| Membrane Thickness (mils) | 1.7-2.0 | 1.9-2.1 |

Examples 5-7

The membranes of Examples 5-7 included disulfonate acid and PBIO, without Inorganic Additives, and were each prepared pursuant to the following procedure. A PBIO solution was prepared in the same manner as discussed above in Example 2. Disulfonate acid was then dissolved in NMP to form a 20% acid solution. The calculated mass of dry disulfonate acid was transferred into a small vial inside a nitrogen purged dry box. A total of about 0.25 grams of the disulfonate acid was used. The calculated amount of NMP was added to the acid inside the dry box. A magnetic stir bar was used for mixing. Dissolution occurred within about 30 minutes. The calculated amount of PBIO solution was then added to the acid solution inside the dry box and mixed with a magnetic stirrer for one hour to form a blended mixture. The blended mixture was then applied to a glass plate and dried in the same manner as discussed above in Example 1 to form a membrane. Table 4 provides the component concentrations, the acid-to-base equivalencies, and the thicknesses of the membranes of Examples 5-7.

TABLE 6

| Composition | Example 5 Percent by Weight | Example 6 Percent by Weight | Example 7 Percent by Weight |
|---|---|---|---|
| Disulfonate Acid | 79.7 | 74.7 | 66.4 |
| PBIO Basic Polymer | 20.3 | 25.3 | 33.6 |
| Acid-to-Base Equivalency | 4:1 | 3:1 | 2:1 |
| Membrane Thickness (mils) | 2.4-2.5 | 1.8-2.4 | 0.8-1.1 |

Examples 8-10

The membranes of Examples 8-10 included mixtures of acids, and were each prepared pursuant to the procedure discussed above for Examples 5-7, except that a mixture of disulfonate acid and $C_1$-bis-imide acid was used instead of disulfonate acid. Table 5 provides the component concentrations, the acid-to-base equivalencies, and the thicknesses of the membranes of Examples 12-14.

TABLE 5

| Composition | Example 8 Percent by Weight | Example 9 Percent by Weight | Example 10 Percent by Weight |
|---|---|---|---|
| Disulfonate Acid | 53.3 | 32.4 | 16.8 |
| $C_1$-bis-Imide Acid | 28.9 | 51.4 | 68.8 |
| PBIO Basic Polymer | 17.8 | 16.2 | 14.4 |
| Acid-to-Base Equivalency | 3:1:1 | 2:2:1 | 1:3:1 |
| Membrane Thickness (mils) | 0.5-1.0 | 2.0-2.3 | 1.3-1.6 |

Example 11

The membrane of Example 11 was prepared pursuant to the procedure discussed above for Example 2, except that a mixture of disulfonate acid and $C_1$-bis-imide acid was used instead of $C_4$-bis-imide acid, AF-100 was used instead of the combination of AF-100 and SiWA, and the membrane of Example 11 was not pressed into a reinforcement matrix. Table 6 provides the component concentrations, the acid-to-base equivalency, and the thickness of the membrane of Example 11.

TABLE 6

| Composition | Example 11 Percent by Weight |
|---|---|
| Disulfonate Acid | 28.3 |
| $C_1$-bis-Imide Acid | 43.0 |
| PBIO Basic Polymer | 13.6 |
| AF-100 Inorganic Additive | 15.1 |
| Acid-to-Base Equivalency | 2:2:1 |
| Membrane Thickness (mils) | 1.8-2.0 |

Example 12

The membrane of Example 12 was prepared pursuant to the following procedure. A PBIO solution was prepared in the same manner as discussed above in Example 2, except that $C_1$-bis-imide acid was used instead of $C_1$-bis-imide acid. Disulfonate acid, $C_1$-bis-imide acid, and SiWA were then dissolved in NMP to form a 20% acid solution. The calculated masses of dry disulfonate acid, dry $C_1$-bis-imide acid, and the SiWa were transferred into a small vial inside a nitrogen purged dry box. A combined total of about 0.25 g of the disulfonate acid and $C_1$-bis-imide acid were used. The calculated amount of NMP was added to the acid inside the dry box. The components and solvent were then mixed with a magnetic stir bar overnight.

The calculated amount of the PBIO solution was then added to the acid/SiWA dispersion inside the dry box and mixed with a magnetic stirrer for one hour to form a blended mixture. The blended mixture was then applied to a glass plate and dried in the same manner as discussed above in Example 1 to form a membrane. Table 7 provides the component concentrations, the acid-to-base equivalency (disulfonate:$C_1$-bis-imide: PBIO), and the thickness of the membrane of Example 12.

TABLE 7

| Composition | Example 12 Percent by Weight |
|---|---|
| Disulfonate Acid | 15.9 |
| $C_1$-bis-Imide Acid | 25.9 |
| PBIO Basic Polymer | 8.1 |
| SiWA Inorganic Additive | 50.1 |
| Acid-to-Base Equivalency | 2:2:1 |
| Membrane Thickness (mils) | 2.2-2.3 |

Examples 13 and 14

The membranes of Examples 13 and 14 were prepared pursuant to the following procedure. A PBIO solution and a corresponding PBIO/inorganic dispersion were prepared in the same manner as discussed above in Example 2, except that $C_1$-bis-imide acid was used instead of $C_4$-bis-imide acid, and AF-100 was used instead of the combination of AF-100 and SiWA.

Disulfonate acid and $C_1$-bis-imide acid were dissolved in NMP to form a 20% acid solution. The calculated masses of dry disulfonate acid, dry $C_1$-bis-imide acid, and the SiWa were transferred into a small vial inside a nitrogen purged dry box. A combined total of about 0.25 g of the disulfonate acid and $C_1$-bis-imide acid were used. The calculated amount of NMP was added to the acid inside the dry box. The components and solvent were then mixed with a magnetic stir bar overnight.

The calculated amount of PBIO/inorganic dispersion was then added to the acid/SiWA dispersion inside the dry box and mixed with a magnetic stirrer for one hour. The blended mixture was then applied to a glass plate and dried in the same manner as discussed above in Example 1 to form a membrane. Table 8 provides the component concentrations, the acid-to-base equivalencies (disulfonate:$C_1$-bis-imide:PBIO), and the thicknesses of the membranes of Example 13 and 14.

TABLE 8

| Composition | Example 13 Percent by Weight | Example 14 Percent by Weight |
|---|---|---|
| Disulfonate Acid | 13.6 | 18.4 |
| $C_1$-bis-Imide Acid | 21.9 | 30.6 |
| PBIO Basic Polymer | 6.9 | 9.5 |
| AF-100 Inorganic Additive | 7.7 | 10.8 |
| SiWA Inorganic Additive | 49.9 | 30.7 |
| Acid-to-Base Equivalency | 2:2:1 | 2:2:1 |
| Membrane Thickness (mils) | 1.5-2.0 | 2.4-2.5 |

Example 15

The membrane of Example 15 was prepared pursuant to the procedure discussed above for Examples 13 and 14, except that PWA was used instead of SiWA. Table 9 provides the component concentrations, the acid-to-base equivalencies (disulfonate:$C_1$-bis-imide:PBIO), and the thickness of the membrane of Example 15.

TABLE 9

| Composition | Example 15 Percent by Weight |
|---|---|
| Disulfonate Acid | 18.4 |
| $C_1$-bis-Imide Acid | 29.9 |
| PBIO Basic Polymer | 9.2 |
| AF-100 Inorganic Additive | 10.4 |
| PWA Inorganic Additive | 32.2 |
| Acid-to-Base Equivalency | 2:2:1 |
| Membrane Thickness (mils) | 2.2-2.7 |

Example 16

The membrane of Example 16 was prepared pursuant to the procedure discussed above for Examples 13 and 14, except that $C_4$-bis-imide was used instead of $C_1$-bis-imide. Table 10 provides the component concentrations, the acid-to-base equivalency (disulfonate:$C_1$-bis-imide:PBIO), and the thickness of the membrane of Example 16.

TABLE 10

| Composition | Example 16 Percent by Weight |
|---|---|
| Disulfonate Acid | 15.1 |
| $C_4$-bis-Imide Acid | 34.5 |
| PBIO Basic Polymer | 9.2 |
| AF-100 Inorganic Additive | 10.3 |
| SiWA Inorganic Additive | 31.0 |
| Acid-to-Base Equivalency | 1.6:1.6:1 |
| Membrane Thickness (mils) | 2.0-2.5 |

Example 17

The membrane of Example 17 is an example of a membrane derived from an inorganic sol, and was prepared pursuant to the following procedure. NMP and n-propanol were added to $ZrO_2$ sol to transfer the $ZrO_2$ sol from its native aqueous solvent to NMP. The amount of NMP was selected to provide the desired final weight percent of the inorganic additives in NMP. The amount of n-propanol used was in excess of what was needed for azeotropic removal of the water in the sol (e.g., about 28.3% water in azeotrope, about 87.7° C. boiling point for azeotrope at standard temperature and pressure, as compared to 97.2° C. for 1-propanol at standard temperature and pressure).

The solution was then distilled until the distillate boiling point reached a plateau value for the n-propanol. More n-propanol was added as necessary and distillation continued until the plateau value was achieved. Residual n-propanol was then removed using a rotary evaporator with an initial bath temperature of 40° C. and −26 inches of mercury vacuum. The bath temperature was then increased to 65° C. and the removal was continued until mass loss versus time became asymptotic. Complete removal of the n-propanol at higher vacuum tended to induce some precipitation, so about 5% by weight residual n-propanol was retained. This amount of residual n-propanol did not induce polymer precipitation during blending. The result was a $ZrO_2$/NMP solution.

A PBIO solution was prepared in the same manner as discussed above in Example 2. The $ZrO_2$/NMP solution was then added to the PBIO solution by adding the $ZrO_2$/NMP solution and 25-30 grams of the PBIO solution to a screw-cap 4 ounce glass bottle. Fourteen ceramic milling cylinders (type BRUNHP050 from U.S. Stoneware Corporation, Eaastine, Ohio) were also added to the glass bottle, and a double layer of 50.8-micrometer (2-mil) Teflon film was inserted between the glass bottle and the bottle cap. The sealed bottle was then rolled on a bottle roller at 100 rotations-per-minute for 24 hours. The number of milling cylinders and the rotations-per-minute were adjusted as needed to induce tumbling in the glass bottle. In addition, the solution viscosity was adjusted as necessary by adding incremental amounts of NMP to the glass bottle.

Disulfonate acid and $C_1$-bis-imide acid were dissolved in NMP to form a 20% acid solution. The calculated masses of dry disulfonate acid and dry $C_4$-bis-imide acid were transferred into a small vial inside a nitrogen purged dry box. A combined total of about 0.25 grams of the disulfonate acid and $C_1$-bis-imide acid were used. The calculated amount of NMP was added to the acid inside the dry box. The components and solvent were then mixed with a magnetic stir bar for 30 minutes. The calculated amount of PBIO/inorganic dispersion was then added to the acid solution inside the dry box and mixed with a magnetic stirrer for one hour. The blended mixture was then applied to a glass plate and dried in the same manner as discussed above in Example 1 to form a membrane. Table 11 provides the component concentrations, the acid-to-base equivalency (disulfonate:$C_1$-bis-imide:PBIO), and the thickness of the membrane of Example 17.

TABLE 11

| Composition | Example 17 Percent by Weight |
|---|---|
| Disulfonate Acid | 11.6 |
| $C_1$-bis-Imide Acid | 55.9 |
| PBIO Basic Polymer | 12.2 |
| ZrO2 Sol | 20.3 |
| Acid-to-Base Equivalency | 1:3:1 |
| Membrane Thickness (mils) | 1.4-1.6 |

Example 18

The membrane of Example 18 was prepared pursuant to the following procedure. A PBIO solution, corresponding PBIO/inorganic dispersion, acid solution, and corresponding blended mixture were prepared in the same manner as discussed above in Example 1.

A 6.4-centimeter×6.4-centimeter square piece of CRANE HM090 reinforcement matrix was taped to a glass plate along one edge and then flipped over using the taped edge as a hinge. The blended mixture was then applied in an open area of the glass plate adjacent the hinge and spread using a 533-micrometer (21-mil) knife gap. The reinforcement matrix was then laid into the spread of the blended mixture. The entire sample was then dried in an oven at 140° C. for five hours in a flammable-rated circulating air oven to remove the NMP. After removal from the oven, the resulting membrane was allowed to stand in open air. Table 12 provides the component concentrations, the acid-to-base equivalency, and the thickness of the membrane of Example 18.

TABLE 12

| Composition | Example 18 Percent by Weight |
|---|---|
| $C_1$-bis-Imide Acid | 58.2 |
| PBIO Basic Polymer | 19.7 |
| AF-100 Inorganic Additive | 22.1 |
| Acid-to-Base Equivalency | 3:1 |
| Reinforcement Matrix | CRANE HM090 |
| Membrane Thickness (mils) | 1.9-2.1 |

Example 19

The membrane of Example 19 was prepared pursuant to the procedure discussed above for Example 17, except that disulfonate was used instead of a combination of disulfonate and $C_1$-bis-imide. Additionally, after applying the blended mixture to the glass plate (2-millimeter thickness) and drying to form a membrane (as discussed above in Example 1), the membrane-coated glass plate was placed on an aluminum plate pre-cooled to −9° C. This increased the rate of cooling of the membrane upon removal from the drying oven. Table 13 provides the component concentrations, the acid-to-base equivalency, and the thickness of the membrane of Example 19.

TABLE 13

| Composition | Example 19 Percent by Weight |
|---|---|
| Disulfonate Acid | 50.9 |
| PBIO Basic Polymer | 17.4 |
| ZrO2 Sol | 31.7 |
| Acid-to-Base Equivalency | 3:1 |
| Membrane Thickness (mils) | 1.5-1.9 |

Example 20

The membranes of Example 20 was prepared pursuant to the procedure discussed above for Example 2, except that disulfonate acid was used instead $C_4$-bis-imide acid, AF-100 was used instead of the combination of AF-100 and SiWA, and the membrane of Example 20 was not pressed into a reinforcement matrix. Additionally, after applying the blended mixture to the glass plate (2-millimeter thickness) and drying to form a membrane (as discussed above in Example 1), the membrane-coated glass plate was placed on an aluminum plate pre-cooled to −9° C. This increased the rate of cooling of the membrane upon removal from the drying oven. Table 14 provides the component concentrations, the acid-to-base equivalency, and the thickness of the membrane of Example 20.

TABLE 14

| Composition | Example 20 Percent by Weight |
|---|---|
| Disulfonate Acid | 47.7 |
| PBIO Basic Polymer | 24.6 |
| AF-100 Inorganic Additive | 27.7 |
| Acid-to-Base Equivalency | 2:1 |
| Membrane Thickness (mils) | 1.4-1.9 |

Example 21

The membrane of Example 21 was prepared pursuant to the following procedure. A PBIO solution, acid solution, and corresponding blended mixture were prepared in the same manner as discussed above in Examples 4-7. A 7.6-centimeter×7.6-centimeter square piece of TETRATEX 1316 reinforcement matrix was taped to a glass plate along one edge. An excess of a 50/50 (by weight) mixture of isopropyl alcohol and NMP was applied to the reinforcement matrix to fill the pores. Excess of this solvent mixture was removed by blotting with a 100% cotton Texwipe cloth, and tension was applied to the corners of the reinforcement matrix to remove wrinkles.

The blended mixture was then applied just below the taped edge and spread using a hand-held Gardner Neotec knife coater using a gap of 508 micrometers (20 mil) relative to the glass plate surface (the reinforcement matrix was about 12.7 micrometers (0.5 mil) thick). The sample was then placed in an explosion proof circulating air oven and dried to remove the solvent by using the following temperature ramp: 10 minutes at 80° C., 10 minutes at 100° C., 10 minutes at 120° C., and 4 hours at 140° C. After removal from the oven, the membrane-coated glass plate was placed on an aluminum plate pre-cooled to −9° C. The membrane was then peeled from the glass plate and was observed to be glossy on both sides and transparent. This showed that the composition of the membrane was present on both sides and that the reinforcement matrix was filled uniformly. Table 15 provides the component concentrations, the acid-to-base equivalency, and the thickness of the membrane of Example 21.

TABLE 15

| Composition | Example 21 Percent by Weight |
|---|---|
| Disulfonate Acid | 74.5 |
| PBIO Basic Polymer | 25.1 |
| Acid-to-Base Equivalency | 3:1 |
| Reinforcement Matrix | TETRATEX 1316 |
| Membrane Thickness (mils) | 2.9-3.3 |

Comparative Example A

The membrane of Comparative Example A, which contained phosphoric acid, was prepared pursuant to the following procedure. 0.90 grams of PBI powder was added to 72.0 grams of trifluoroacetic acid (biological grade from Alfa Aesar) in a 3-neck round bottom flask equipped with condenser, mechanical stirrer, and static head of nitrogen. This mixture was held at reflux for 22 hours. After cooling to room temperature, 11.07 grams of 85% phosphoric acid was added. Considering that only one proton per phosphoric acid molecule is strongly acidic, this amount provided three equivalents of phosphoric acid per equivalent of base from PBI.

The mixture was then brought to reflux for an additional hour. After cooling, the mixture was filtered through a Whatman glass fiber filter using a stainless steel pressure filter. Six milliliters of the filtrate was then applied to a glass plate and spread using a handheld Gardner-Neotec knife coater using a gap of 635 micrometers (25 mils) inside a fume hood. It coated plate was then covered with a 180-millimeter Petri dish that had a tight fit with the glass plate. The dish was lifted briefly at one hour intervals for about five hours, and the allowed to stand in the fume hood overnight. This provided a very slow, controlled rate of drying. The membrane adhered to the glass plate was dried further at 80° C. in an explosion proof circulating air oven for 20 minutes followed by and additional 30 minutes at 120° C. Upon cooling, there was no detectable odor of trifluoroacetic acid. The membrane was then peeled from the glass plate and its thickness determined to be 43.2 micrometers (1.7 mil). The acid-to-base equivalency for the membrane of Comparative Example A was 3:1 (phosphoric acid:PBI).

Conductivity Testing of Examples 1, 2, and 4-20

The conductivities of the electrolyte membranes of Examples 1, 2, and 4-20 were each quantitatively measured by the following procedure. AC impedance was measured using a four-point probe conductivity cell from BekkTech (Loveland, Colo.) on a 1-centimeter×3-centimeter sample of the electrolyte membrane. The conductivity cell was electrically connected to a potentiostat (Model 273, Princeton Applied Research) and an Impedance/Gain Phase Analyzer (SI 1260, Schlumberger). The sample was first conditioned in the cell for 5 hours at 120° C. with an 80° C. dew point (less than 0.3% relative humidity). AC impedance measurements were then performed using Zplot and Zview software (Scribner Associates).

AC impedance measurements were then performed at 90° C. (36% relative humidity) and 120° C. (less than 0.3% relative humidity) after conditioning for one hour (all at constant 80° C. dew point). For each sample, the ionic (in this case is proton) conductivity was calculated from the average AC impedance at high frequency by following the formula, where "R" is the AC impedance measurement, "L" is the length of the sample, and "A" is the cross-sectional area of the sample:

$$\text{Conductivity} = \left(\frac{1}{R}\right)\left(\frac{L}{A}\right)$$

Table 16 provides the conductivity results for the electrolyte membranes of Examples 1, 2, and 4-20, where the conductivities are noted in units of millisiemens/centimeter (mS/cm).

TABLE 16

| Example | Conductivity (90° C.) | Conductivity (120° C.) Down Scan | Conductivity (120° C.) Up Scan |
| --- | --- | --- | --- |
| Example 1 | 9.0 | 3.3 | 3.3 |
| Example 2 | 3.3 | 0.8 | 0.9 |
| Example 4 | 100.0 | 3.2 | 10.4 |
| Example 5 | 30.0 | 1.4 | 2.4 |
| Example 6 | 43.0 | 2.3 | 5.7 |
| Example 7 | 6.2 | 0.5 | 0.6 |
| Example 8 | 12.0 | 1.6 | 1.6 |
| Example 9 | 7.3 | 0.9 | 1.3 |
| Example 10 | 10.0 | 4.3 | 4.3 |
| Example 11 | 30.0 | 4.2 | 5.3 |
| Example 12 | 12.0 | 1.1 | 1.4 |
| Example 13 | 30.0 | 3.0 | 6.0 |
| Example 14 | 30.0 | 1.6 | 3.0 |
| Example 15 | 60.0 | 2.5 | 6.0 |
| Example 16 | 50.0 | 1.0 | 1.3 |
| Example 17 | 10.0 | 2.8 | 3.8 |
| Example 18 | 40.1 | 2.0 | 4.2 |
| Example 19 | 38.0 | 1.6 | 2.9 |
| Example 20 | 20.4 | 1.3 | 5.7 |

The data provided in Table 16 illustrate the good electrical conductance exhibited by the electrolyte membranes of Examples 1, 2, and 4-20. In particular, the electrolyte membrane of Examples 4, 15, and 16 exhibited high conductivities at 90° C. The electrolyte membrane of Example 4 included disulfonate acid, PBIO basic polymer, and AF-100 fumed silica. The electrolyte membranes of Example 15 and 16 included a mixture of acids, PBIO basic polymer, AF-100 fumed silica, and SiWa/PWA. As such, the electrolyte membrane of Examples 4, 15, and 16 may provide high proton conductivities for use in fuel cells. In addition, PBIO is stable to hydrolysis, and the acids are low-volatility acids that are fluorinated and are oligomeric. As such, these electrolyte membranes are suitable for use in MEAs and fuel cells at high operating temperatures.

The data also show that low levels of humidification and higher temperatures significantly reduce conductivities. For example, the electrolyte membranes of Examples 1, 2, and 4-20 exhibited significantly greater conductivities at 90° C. (36% relative humidity) compared to 120° C. (less than 0.3% relative humidity).

There was also a noticeable hysteresis between the up scan and down scan conductivities, with greater conductivities during the up scan. The down scan started at 120° C. after conditioning at 120° C. for 5 hours with a 80° C. dew point. For the up scan, the electrolyte membrane came from a more humidified condition, which may have accounted for the greater conductivities.

Exudation Testing of Examples 3-17, 19, and 20

The electrolyte membranes of Examples 3-17, 19, and 20 were each quantitatively measured for exudation (i.e., acid washout) by the following procedure. A 5-centimeter$^2$ piece of the membrane was cut and placed in a nitrogen-flushed dry box overnight to dry. The dry mass was then recorded as the initial mass of the membrane. For the "dry" test condition, the membrane was evaluated in its dry condition as indicated below shortly after removal from the dry box. For the "humidified" test condition, the membrane was exposed to ambient humidity for 24 hours before testing (room temperature was 22° C.).

A pair of 5-centimeter×5-centimeter square pieces of a microstructured film were prepared as described in Spiewak et al., U.S. Pat. No. 6,136,412. The films were then dried at 140° C. for 30 minutes, and then cooled in the dry box. The combined dry mass of the two films was recorded as the initial mass. Each film had a 90/12 microstructured pattern consisting of repeating peaks and valleys in which the included angle of the valley side walls is 90 degrees and the distance between valleys is 12 micrometers. The peak heights were nominally 6 micrometers tall, with a 9-micrometer peak repeated every thirtieth groove. The grooves were formed by microreplication using a UV-cured acrylate composition. The use of this type of film has the advantage that it provides an open space for exudate. The membrane was placed between two pieces of the microstructured film with the grooves facing the membrane and then pressed for 10 minutes at 8.6 megapasals (1250 pounds/inch) and 132° C. The pressure was calculated from the initial sample area and the applied press force.

The pieces of microstructured film were then separated from the membrane after cooling, dried at 140° C. for 30 minutes, and cooled in the dry box. The combined dry mass of the two films were recorded as the final mass. The amount of exudation released from the membrane, measured as the percent weight change of the membrane, was calculated by following the formula:

$$\% \text{ Exudation} = \frac{(Mass_{film,i} - Mass_{film,f})100}{Mass_{membrane,i}}$$

where "$Mass_{film,i}$" is the initial mass of the microstructured film, "$Mass_{film,f}$" is the final mass, and "$Mass_{membrane,i}$" is the initial mass of the membrane. Table 17 provides the humidified exudation results and ranges of relative humidities for the membranes of Examples 3-17, 19, and 20, and Table 18 provides the dry exudation results and ranges of relative humidities for the membranes of Examples 5, 8, 9, 11, and 14.

TABLE 17

| Example | Percent Exudation (Humidified) | Percent Relative Humidity |
| --- | --- | --- |
| Example 3 | 6 | N/A |
| Example 4 | 12 | 36-53 |
| Example 5 | 22 | 20-24 |
| Example 6 | 22 | 53-59 |
| Example 7 | 11 | 50-59 |
| Example 8 | 30 | 20-24 |
| Example 9 | 33 | 20-24 |
| Example 10 | 35 | N/A |
| Example 11 | 16 | 20-24 |
| Example 12 | 22 | 47-54 |
| Example 13 | 3 | 24-27 |
| Example 14 | 21 | 20-24 |
| Example 15 | 9 | 45-59 |
| Example 16 | 5 | 45-59 |
| Example 17 | 12 | 20-24 |
| Example 19 | 4 | 55-60 |
| Example 20 | −1 | 55-60 |

TABLE 18

| Example | Percent Exudation (Dry) | Percent Relative Humidity |
| --- | --- | --- |
| Example 5 | 16 | 20-24 |
| Example 8 | 11 | 20-24 |
| Example 9 | 35 | 20-24 |
| Example 11 | 2 | 20-24 |
| Example 14 | 13 | 20-24 |

The data in Tables 17 and 18 show that exudation was lower with increased concentrations of inorganic additives and with lower concentrations of the acid. These results, in combination with the conductivity results discussed above illustrate the benefits of including inorganic additives in the electrolyte membranes of the present invention. Additionally, the membranes that were tested under both the dry conditions and the humidified conditions generally exhibited higher levels of exudation after being humidified. The relative humidity values provided in Table 17 are the ranges of relative humidities recorded while the membranes were exposed to ambient humidity for 24 hours before testing.

Fuel Cell Evaluation of Examples 4, 11, 18, and Comparative Example A

An evaluation of the electrolyte membrane of Example 4 under fuel cell conditions was performed pursuant to the following procedure. A 5-layer MEA was made using the electrolyte membrane of Example 4, which was disposed between a pair of catalyst layers and a pair of gas diffusion layers in the same manner as discussed above in FIG. 1. The MEA exhibited a major surface area of 5-centimeters$^2$, and was symmetrically disposed around the electrolyte membrane. The area of the electrolyte membrane was greater than 5-centimeters$^2$ area so that the electrolyte membrane was configurable over a gasket to form a gas seal.

The catalyst layers and the gas diffusion layers were provided as one lot of machine coated catalyst layer on a roll of gas diffusion layer as described in patent application Velamakanni et al., U.S. Patent Application Publication No. 2004/0107869. The catalyst was a commercially available as a 50% platinum catalyst on a high surface area carbon, purchased from Nippon Engelhard Catalyst Corporation, Japan. The binder of the catalyst consisted of 1000 equivalent weight NAFION (DuPont, Wilmington, Deleware) with an ionomer to carbon ratio of 0.8. The mass loading of the coating was 0.4 milligrams/centimeter$^2$ platinum. The MEA was assembled in a 5-centimeter$^2$ cell purchased from Fuel Cells Technologies, NM. The gasket was a PTFE, glass fiber reinforced, gasket commercially available from Nott Corporation, MN, and had a caliper 70% of the caliper of the catalyst coated layer, which lead to a 30% compression. The MEA was formed by bonding the seven layer (i.e., the five layers and two gaskets) by pressing the sample at a total pressure of 907 kilograms (i.e., 1 ton) between platens heated to 132° C. for ten minutes.

The flow field used was a standard Fuel Cell Technologies, NM 5-centimeter single serpentine. The cell was bolted together with a torque wrench setting of 110 foot-pounds. The test station included mass flow controllers (MKS, MA) to regulate flow, HPLC pumps (Lab Alliance, Pennsylvania) to meter in water that was vaporized in an ejector to hit the set point gas humidification, temperature controllers (Love Controls, IN), and electronics (Agilent, Calif.) to measure and control the current voltage performance of the cell. A computer running LabVIEW-based software (National Instruments, Austin, Tex.) controlled the station and data collection. Electrochemical impedance measurements were used to measure the MEA resistance of the sample under test. A fast Fourier transform method was used in which a square wave signal was sent across the fuel cell test circuit, which included a shunt resistor that served as the reference.

The cell temperature was raised to 100° C. under dry gas flow. Hydrogen flow was set at 100 standard-cubic centimeters (sccm) and air flow at 500 sccm for the duration of the experiment. After twenty minutes the HPLC pumps were started to meter in water to humidify the gas streams to an 80° C. dew point, which was maintained for the duration of the experiment. Polarization curves were taken continuously in a voltage control mode stepping from 0.9 to 0.3 volts with a 0.05 voltage step and a 15 second dwell time between each step. Between each polarization scan the fuel cell was held at 0.3 volts for two minutes as the current was recorded. Data was collected for 8 hours at 100° C. cell temperature, then for 4.5 hours at 110° C., and then for 4.5 hours at 120° C. This was repeated until the test was stopped.

Figure 2:
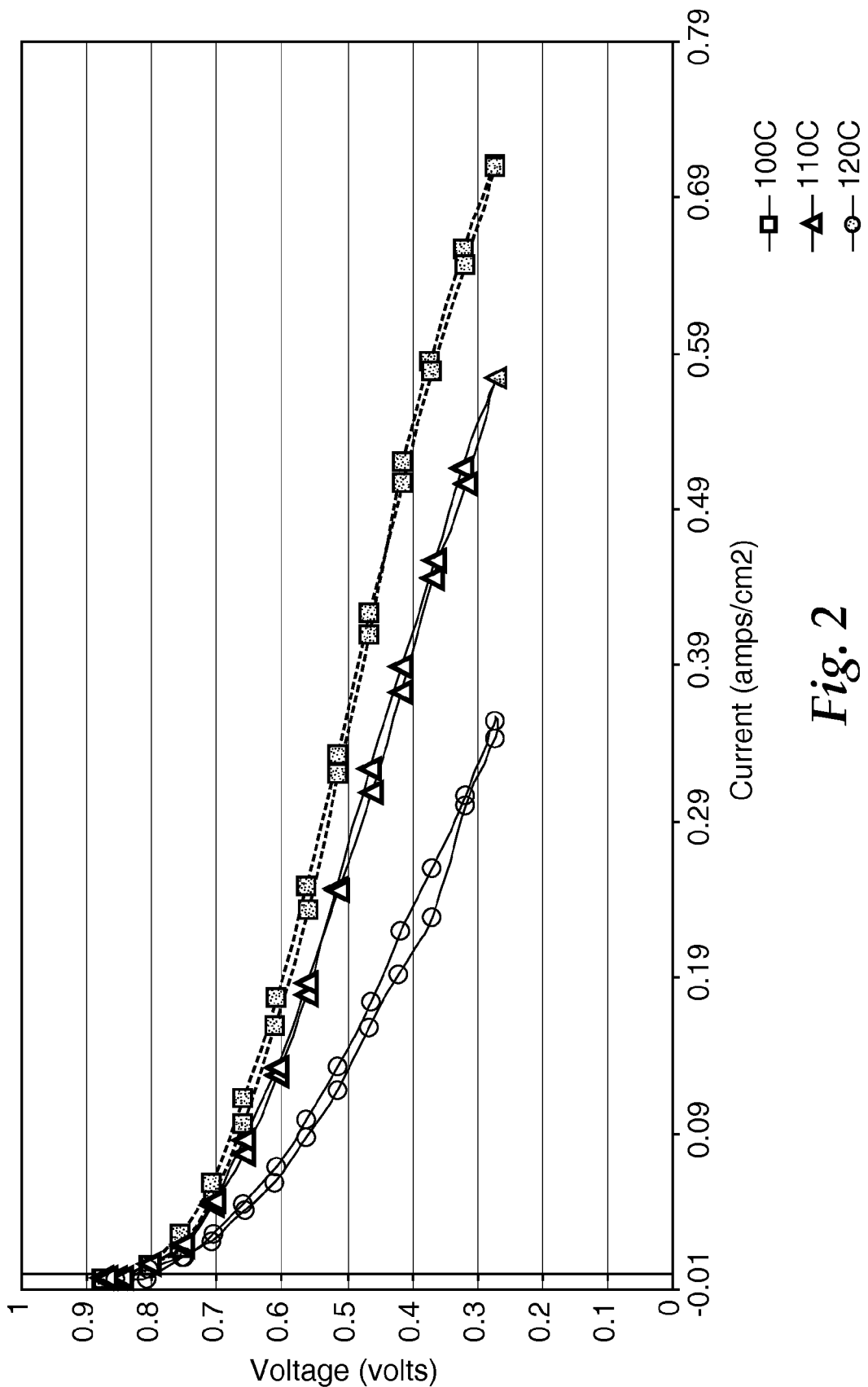
FIGS. 2-5 are graphs illustrating polarization curves of exemplary electrolyte membranes of the present invention and a comparative electrolyte membrane.
Figure 3:
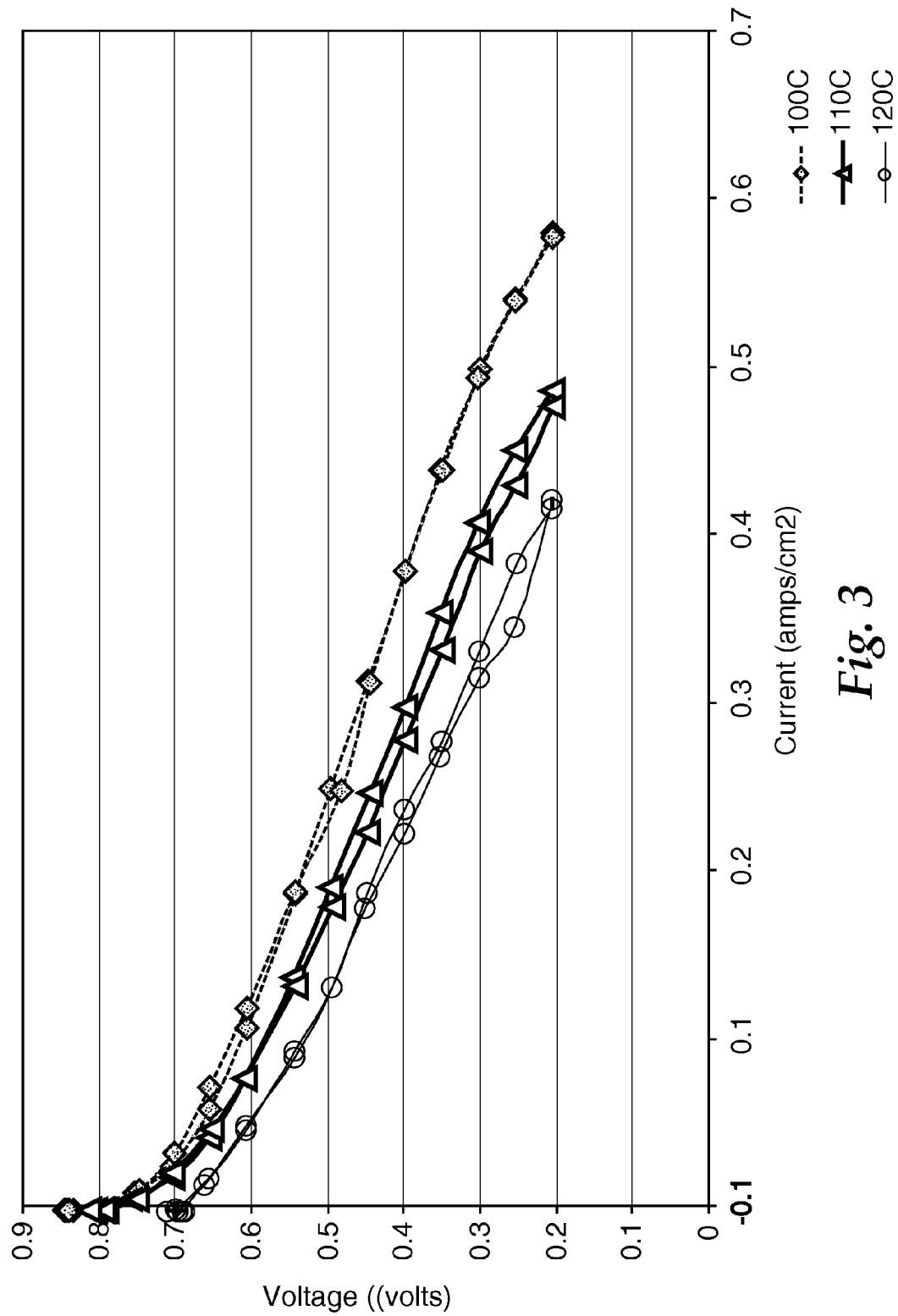
Figure 4:
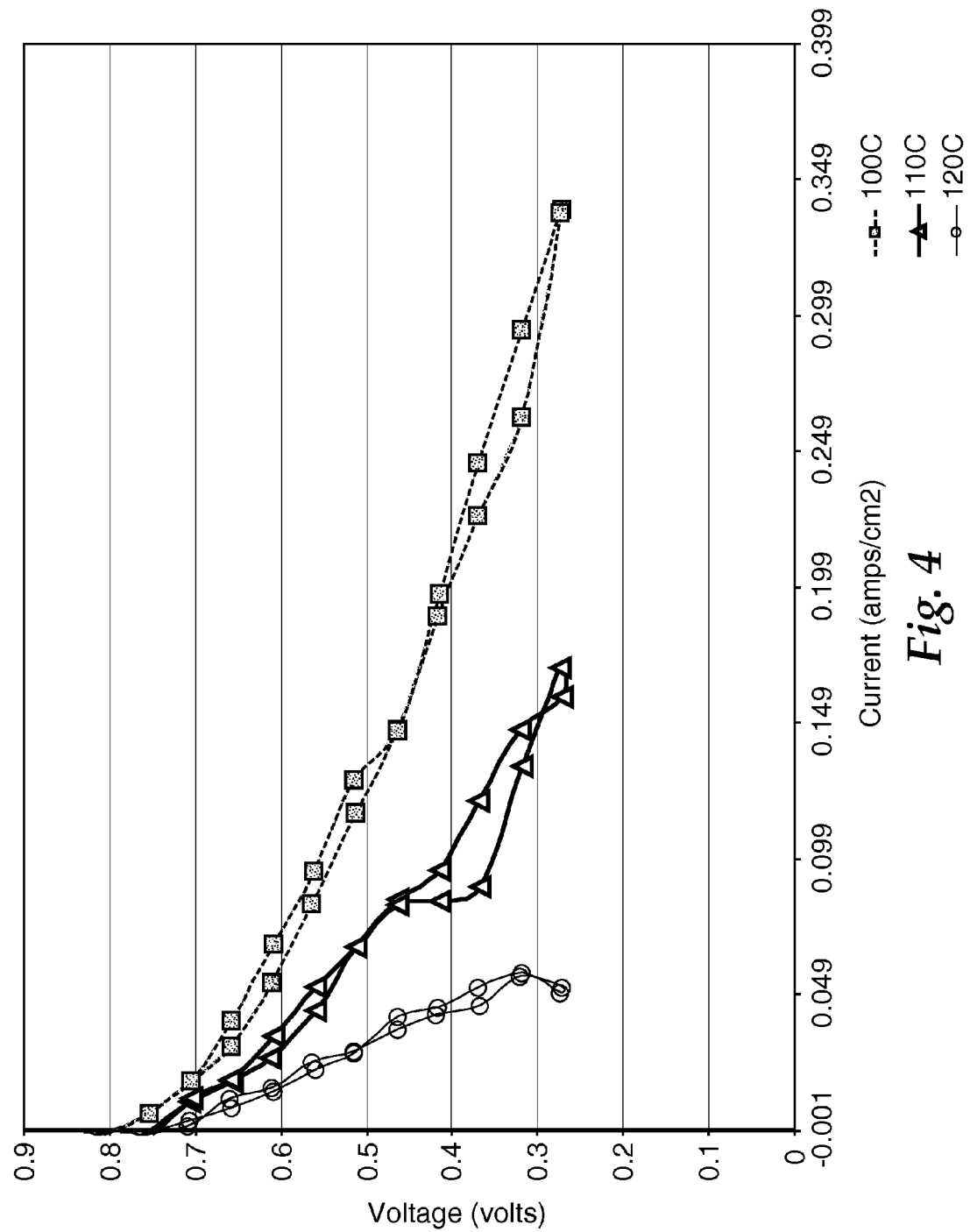

FIGS. 2-4 are graphs illustrating polarization curves of the electrolyte membranes of Examples 1, 11, and 18. The graphs show the voltages recorded at the varying currents at 100° C., 110° C., and 120° C. during the fuel cell evaluations. FIGS. 2-4 show that as the cell temperature increased, the proton conductivities of the electrolyte membranes of Example 1, 11, and 18 decreased. A comparison of the graphs also show that electrolyte membrane of Example 4 exhibited the highest levels of conductivity at all three temperature ranges.

Figure 5:
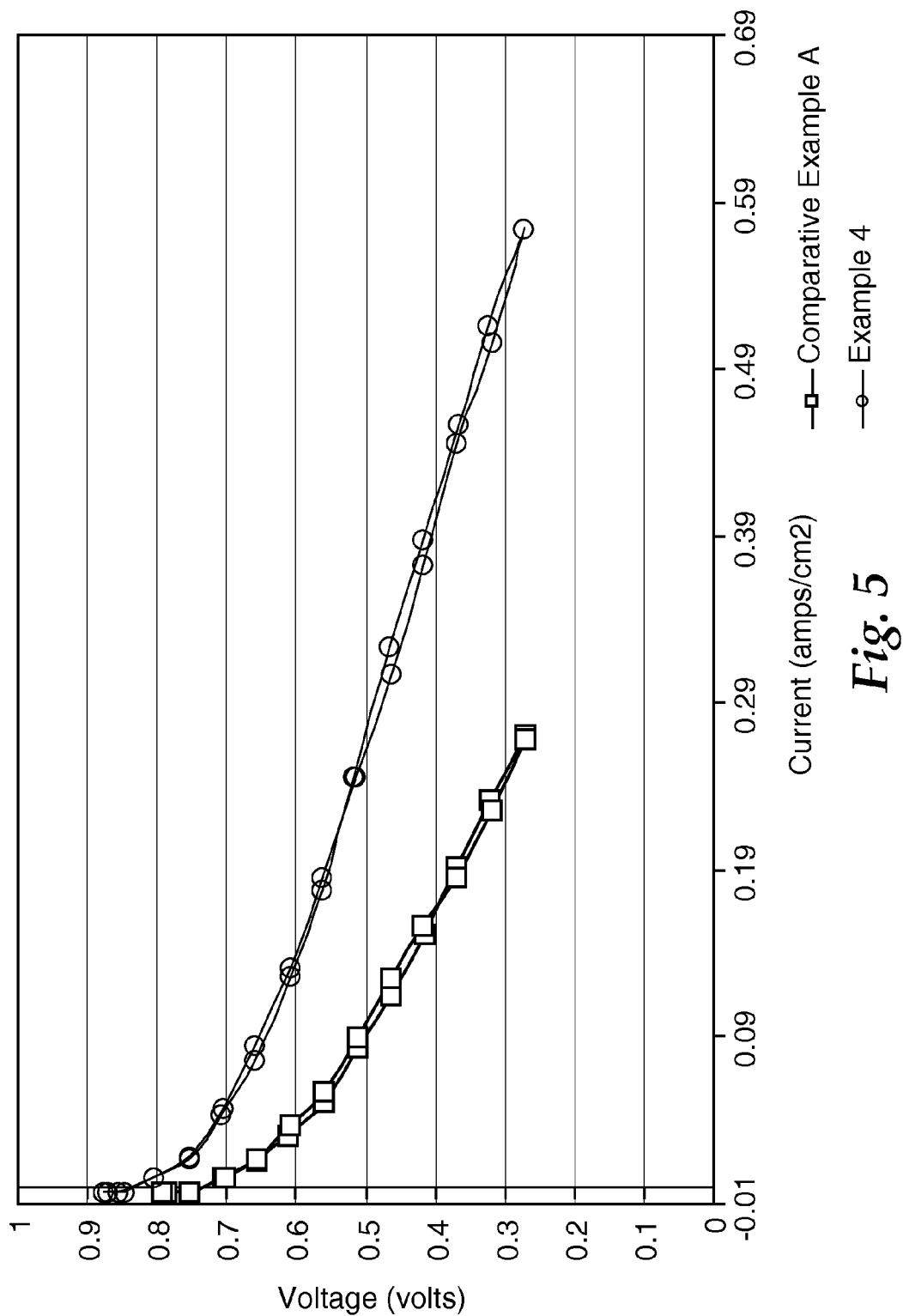

FIG. 5 is a graph illustrating polarization curves of the electrolyte membrane of Example 4 and Comparative Example A. The graph shows the voltages recorded at the varying currents at 110° C. during the fuel cell evaluations. The electrolyte membrane of Comparative Example A contained PBI and phosphoric acid. As discussed above, phosphoric acid may poison platinum catalyst layers of fuel cells, thereby reducing their effectiveness. Additionally, as shown in FIG. 5, the electrolyte membrane of Example 4, which was free of phosphoric acid, exhibited greater proton conductivity compared to the electrolyte membrane of Comparative Example A at 110° C. This further illustrates the benefits using electrolyte membranes of the present invention at elevated operating temperatures. Accordingly, the electrolyte membranes of the present invention may be used at high operating temperatures while preserving proton conductivity.

Although the present invention has been described with reference to preferred embodiments, workers skilled in the art will recognize that changes may be made in form and detail without departing from the spirit and scope of the invention.

The invention claimed is:

1. An electrolyte membrane comprising:
   a fluorinated acid that contains in a range from 2 to 20 acid-functional groups per molecule and has a molecular weight of less than 10,000, wherein the fluorinated acid is selected from the group consisting of (a) perfluorinated imide acids and (b) perfluorinated sulfonic acids and perfluorinated imide acids;
   a basic polymer protonated by the fluorinated acid, and comprising a polyimidazole; and
   containing less than 25% by weight phosphoric acid.

2. The electrolyte membrane of claim 1, wherein the fluorinated acid is selected from the group consisting of $HO_3S(CF_2)_nSO_3H$, $C_mF_{2m+1}SO_2NHSO_2(CF_2)_nSO_2NHSO_2C_mF_{2m+1}$, compounds there of where the $(CF_2)_n$ group comprises a first heteroatom, compounds thereof where the $C_mF_{2m+1}$ group comprises a second heteroatom, and combinations thereof, wherein n ranges from 1-10 and m ranges from 1-8, and wherein the first heteroatom and the second heteroatom are each selected from the group consisting of oxygen and nitrogen.

3. The electrolyte membrane of claim 1, wherein the polyimidazole is selected from the group consisting of poly[2,2'-(m-phenylene)-5,5'-bibenzimidazole], poly(2,5-benzimidazole), a polymer comprising

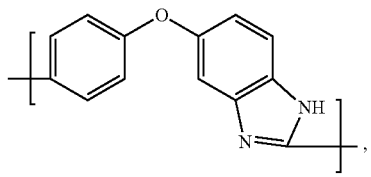

and combinations thereof.

4. The electrolyte membrane of claim 1, further comprising inorganic additives.

5. The electrolyte membrane of claim 1, further comprising a reinforcement matrix.

* * * * *

UNITED STATES PATENT AND TRADEMARK OFFICE
CERTIFICATE OF CORRECTION

PATENT NO. : 8,323,809 B2
APPLICATION NO. : 12/882310
DATED : December 4, 2012
INVENTOR(S) : James M Larson It is certified that error appears in the above-identified patent and that said Letters Patent is hereby corrected as shown below:

Title Page 2, Item (56), Column 1 (Other Publications)
Line 1, delete "-1,2-" and insert -- 1, 2 --

Column 11
Line 8, delete "reparatory" and insert -- separatory --

Column 13
Line 48, delete "pound/inch)." and insert -- pound/inch$^2$). --

Column 22
Line 51, delete "pound/inch)" and insert -- pound/inch$^2$) --

Column 24
Line 18, delete "5-centimeter" and insert -- 5-centimeter$^2$ --

Signed and Sealed this
Nineteenth Day of March, 2013

Teresa Stanek Rea
*Acting Director of the United States Patent and Trademark Office*